March 10, 1959

R. SENIOR, JR 2,877,332

STRIP HEATER

Filed July 5, 1955

Inventor
Robert Senior, Jr.
By Shoemaker & Mattare
ATTYS

March 10, 1959 R. SENIOR, JR 2,877,332
STRIP HEATER
Filed July 5, 1955 2 Sheets-Sheet 2
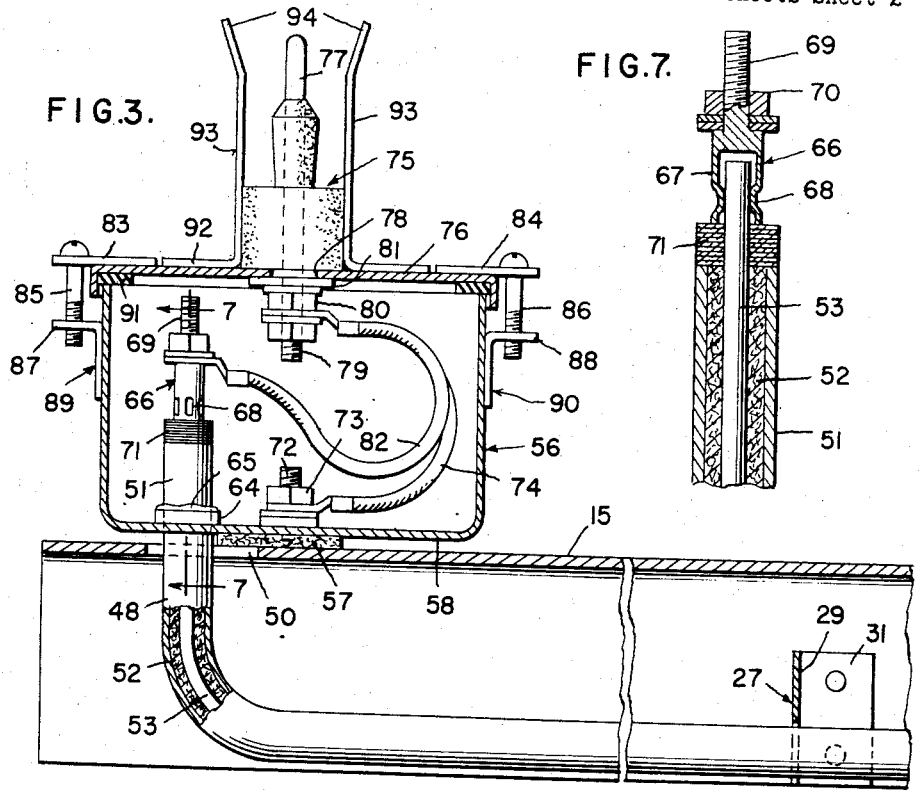
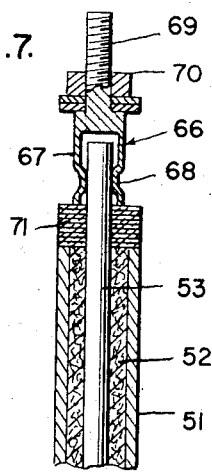
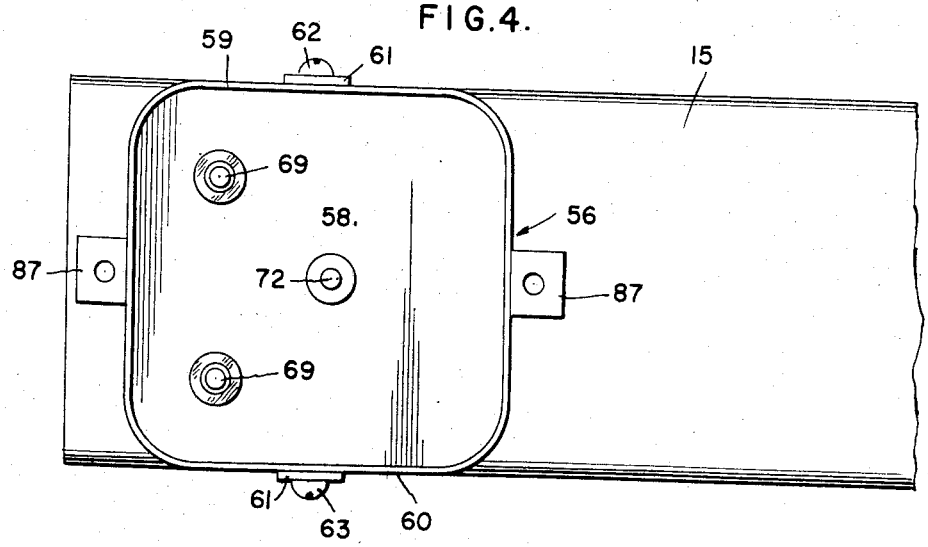
Inventor
Robert Senior, Jr.
By Shoemaker & Mattare
ATTYS.

United States Patent Office 2,877,332
Patented Mar. 10, 1959

2,877,332

STRIP HEATER

Robert Senior, Jr., Cincinnati, Ohio, assignor to Empire Products, Incorporated, Cincinnati, Ohio, a corporation of Ohio Application July 5, 1955, Serial No. 519,827

2 Claims. (Cl. 219—19)

This invention relates generally to welding accessories and pertains more particularly to portable strip heaters for localized preheating of a workpiece or workpieces prior to performing a welding operation on the same.

In the welding particularly of plate-like elements, it is advantageous to preheat the same in the area to be welded in order to effect a gradual distribution of heat in and away from the immediate area of welding so as to effect a large heated area of greatest intensity along the line of weld and gradually diminishing therefrom. This minimizes the temperature differential in the plates as the welding process is carried out and thereby minimizes misalignment, warping, buckling or distortion of and between the plates being welded. It also minimizes distortion of the plates after they have cooled to normal temperature and reduces the amount of internal stress in and around the weld joint so that the finished product is not only characterized by lack of distortion but also possesses greater strength than results with welding without preheating. These characteristics obviate the necessity for artificially "normalizing" the welded articles. Furthermore, welds produced in the presence of preheating are characterized by greater penetration and, moreover, the desired penetration can be accomplished with less "heat" or amperage applied to the welding electrode in the case of electric arc welding and with a smaller welding tip and gas pressure in the case of gas welding. Still further, welding carried out in the presence of preheating is faster than welding articles at normal temperature. Of course, the general proposition of preheating is old and well known but to my knowledge the provision of a light, portable strip heater particularly adapted for use in heating marginal edge portions of plates that are to be butt- or otherwise welded is new.

It is, therefore, a primary object of this invention to provide a portable lightweight yet durable strip heater particularly useful in conjunction with plate members to be welded together.

Another object of this invention is to provide a strip heater characterized by its portability and by its small size wherein it presents no substantial obstruction for the manipulation of welding tools during the welding operation.

Still another object of this invention resides in the construction and arrangement of parts wherein the strip heater is imparted rigidity and durability and particularly wherein the electrical heating element is so mounted on the structure that it is protected thereby and wherein the electrical plug outlet or connection is rigidly and protectively mounted on the assembly.

A further object of this invention is to provide an improved form of strip heater which includes a body and support section of inverted channel shaped configuration which carries an electrical heater therein in substantially flush position with the lower edges of the channel and wherein the body is provided with cross bracing bracket members which suspend the electrical heater element therein while at the same time permitting and allowing for longitudinal expansion of the same.

A still further object of the invention is to effect a maximum heating effect from a relatively lightweight and portable heating unit and to do so in such a manner that the assembly may be very closely positioned to the edge portion of a plate which is to be welded to a similar plate such that the heating effect will be transferred very close to the edge of the plate for maximum efficiency.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 3 is an enlarged longitudinal vertical section taken through a portion of the strip heater;

Fig. 4 is a top plan view of the enlarged section shown in Fig. 3;

Fig. 7 is an enlarged longitudinal section taken through one of the end portions of the heating element.

Figure 1:
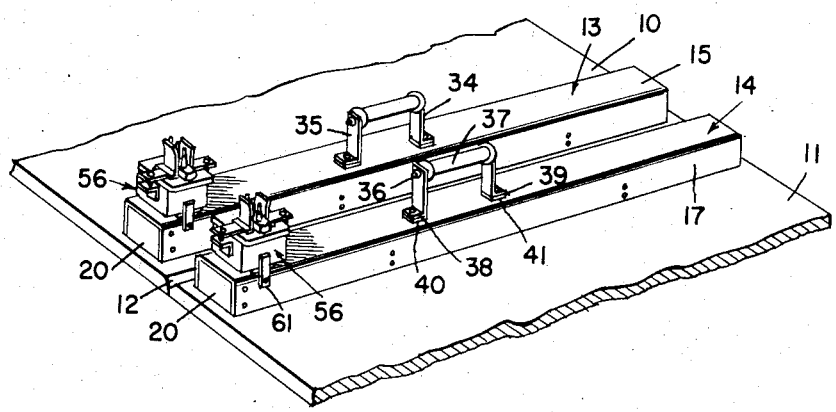
Fig. 1 is a perspective view showing a pair of plate members disposed in position to be welded and showing a pair of strip heaters operatively associated therewith in position to most advantageously preheat the plates for welding.

Referring now more particularly to Fig. 1, numerals 10 and 11 indicate a pair of plate members which are to be welded together. The two plates as shown are beveled along their adjacent edges to provide the V-shaped groove 12 as is the standard practice for effecting butt welds. A pair of strip heaters are designated generally by the reference characters 13 and 14 and each, as shown, is positioned upon an associated plate 10 or 11 in close proximity to the edge thereof which is to be welded to the other plate and it will be noted that the heaters, which are elongate, are positioned lengthwise in parallelism with the plate edges so as to effect a uniform heating along such edges.

It is, of course, to be understood that the particular type of weld to be effected forms no part of this invention, the strip heaters being suitable for purposes of preheating any type of weld to be performed. That is, the plates 10 and 11 need not necessarily be so associated as to be butt welded, they may be disposed at angles to each other, overlapped or so associated as to form any desired type of weld.

It is desirable insofar as the type of weld is concerned only that the strip heaters be so associated with the line or region upon which weld material is to be placed such that the heating effect will be had substantially uniformly therealong and so that the maximum heating will take place closely adjacent to the area to be welded.

Figure 2:
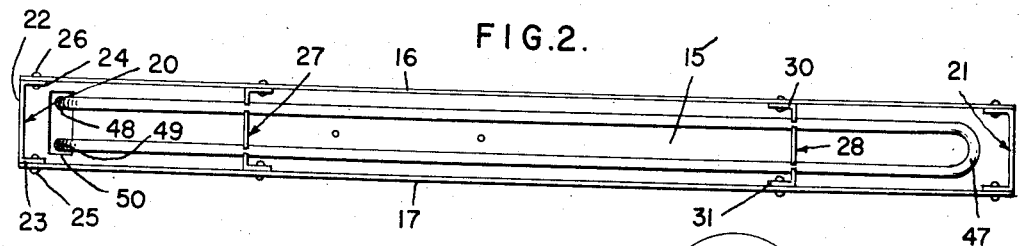
Fig. 2 is a bottom plan view of one of the strip heating assemblies constructed in accordance with my invention.
Figure 6:
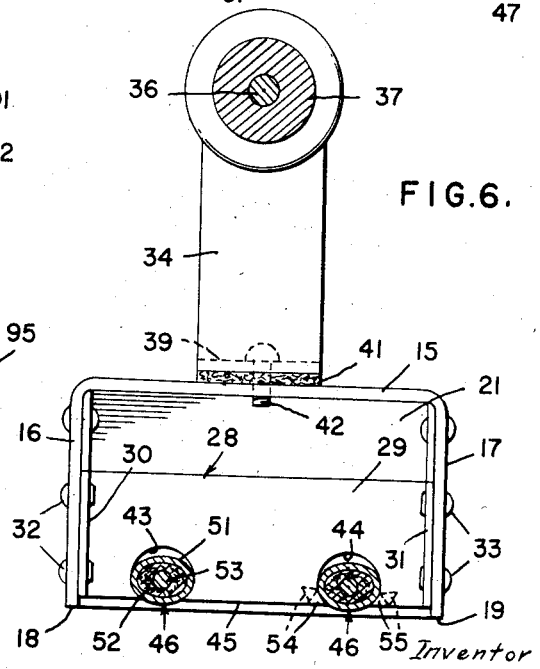
Fig. 6 is an enlarged transverse sectional view taken through a medial portion of the strip heater.

As will be more clearly seen in Figs. 2 and 6, each strip heater consists of an elongate inverted channel shaped body portion having a horizontal web 15 and at opposite longitudinal sides thereof depending legs or flanges 16 and 17 whose free edge portions 18 and 19 serve as the supporting portions for the body. The body is provided at its opposite ends with end cover members 20 and 21 each of which is formed of U-shaped configurations having a vertical bight 22 extending between the opposite flanges 16 and 17 such that when the heater is placed upon an associated plate the flanges 16 and 17 together with the web 15, the end cover bights 22 and the plate form an enclosure within which the heating effect is most advantageously produced. Each end cover also includes vertical legs 23 and 24 which lie closely adjacent to and on inner sides of the flanges 16 and 17 and which are rigidly secured thereto as by rivets 25 and 26. As many rivets as may be required to effect and impart the desired rigidity to the structure may be utilized. The lower edges of the bights 22 as well as the legs 23 and 24 are flush with the lower edegs 18 and 19 of the flanges 16 and 17, it being particularly desirable to maintain a substantially tight enclosure so as to most beneficially and properly transfer heat to the plates 10 and 11.

The intermediate portion of the flanges 16 and 17 are rigidly interconnected by cross bracing members 27 and 28 which include the transverse strip portions 29 which terminate at their opposite ends in the right angularly disposed and parallel feet 30 and 31 which engage against the inner surfaces of the flanges 16 and 17 and which are rigidly secured thereto as by rivets 32 and 33. Insulation material may or may not be interposed between the feet 30 and 31 and the flanges 16 and 17, the purpose of this construction being presently apparent.

As many cross brace members 27 and 28 as are required to impart a good degree of rigidity to the body are utilized and in this respect it has been found that two such cross brace members evenly spaced may be advantageously used, in a strip heater whose overall length measures approximately 27″. Of course, the strip heater may be of any desired length but in this respect it may be pointed out that wherever possible according to the run of production of articles to be welded, it is desirable to secure some correspondence between the length of the strip heaters and the length of the articles to be welded. For example, in such arts as ship building or the like, wherein many plates may be of substantially uniform dimensions, it is most advantageous to utilize strip heaters having identical lengths as the plates to be welded. Of course, on any work which demands a long welding pass, any desired number of strip heaters may be laid end to end to provide a uniformity of heating throughout the length of the pass to be made.

One form of heater which works extremely well was constructed of a length of 27″, being 3″ wide and 1⅞″ high, that is in the main body portion thereof. It is extremely important to maintain the overall height of the strip heaters as small as it is practicable since only in this manner may they be positioned very close to the edge of the article to be welded without interfering with the welding operation.

The main body portion of the strip heaters as well as all component parts which may practically be so formed are constructed of aluminum although it is to be understood that any suitable metal may be utilized in their construction. The use of aluminum is particularly advantageous from the standpoint of maintaining the overall weight of the unit as light as possible, since one of the advantages of the invention resides in its extreme portability and usefulness on jobs wherein the area of the work is of substantial extent.

For ease of carrying, the web 15 is provided on its top surface with a pair of L-shaped bracket members 34 and 35 which are disposed in spaced relation and which are interconnected at their upper free ends by the bolt member 36 passing concentrically through a hollow handle member 37. The feet 38 and 39 of the handle brackets preferably have strips of insulating material 40 and 41 disposed therebeneath between such feet and the web 15 so that heat transfer between the main body and the brackets will be held to a minimum. The feet 38 and 39 are rigidly secured to the web by any suitable means such as the screw fasteners indicated by the reference character 42.

The cross brace members 27 and 28 are each provided with a pair of openings 43 and 44 therein and as will be seen most clearly in Fig. 6, these openings extend to and intersect the lower edge 45 of such cross braces. The openings receive therein portions of an elongate electrical heater strip or rod 46 which, as shown in Fig. 2, is continuously disposed in two flights within the confines of the main body, being looped at one end as at 47 and having upturned free end portions 48 and 49 which project vertically above the web 15 through openings 50 therein, see particularly Fig. 3. The heater rod may be of any commercially available form and in itself forms no part of this invention, although it may be pointed out that the rod consists of an outer sheet of metal 51 having inner lining of insulating material such as asbestos 52 and a centrally disposed and longitudinally extending conductor 53 which is composed of suitable elements such as to provide proper resistance such that when an electrical current is passed therethrough a substantial heating effect is had therein. Compositions of nickel and chrome are commonly used in such wire or conductor.

The openings 43 and 44 in the cross brace members are substantially larger in diameter than the diameter of the heating rod such that the rod is loosely supported therein and it will be noted that the lower edge 45 of the cross strips are disposed vertically above the lower edges 18 and 19 of the flanges 16 and 17 a slight distance such that the lowermost portions of the heater rod 46 are disposed in substantially flush alignment with the lower edges 18 and 19 of the flanges, thus placing the heating rod in as close proximity with the work as is possible. The cross brace strip portions 29 are provided with the particularly positioned apertures 43 and 44 so that the ears 54 and 55 may be bent back as indicated in dotted lines in Fig. 6 such as to permit entry of the heater rod into the apertures. Thereafter, the ears are bent back into the plane of the strips 29 such that the heater rods are confined within the apertures 43 and 44 and are held therein in suspended relation. At the same time, the heater rod is loosely held within the apertures such that when current is applied thereto and the rod is heated to its normal operating temperature, the normal expansion thereof is compensated for and it may perform such longitudinal expansion or extension without binding upon the cross brace members.

A juncture box 56 is rigidly secured to the web portion 15 adjacent one end of the main body with a strip of insulating material such as asbestos 57 interposed between the web 15 and the bottom wall 58 of the box in the manner shown most clearly in Fig. 3. Opposite sides 59 and 60 of the juncture box are provided with downwardly extending or depending straps 61 which are rigidly secured to the side walls at their upper ends by suitable means such as welding or the like and which are apertured at their lower ends for the reception of screw fasteners 62 and 63 which project into the flanges 16 and 17 and rigidly secure the juncture box to the main body of the strip heater. The bottom wall 58 is provided with a pair of spaced apertures for receiving the upper end portions of the rod ends 48 and 49 and it will be noted that these apertures are so formed that an upstanding peripheral wall 64 surrounds each such aperture. This wall forms a convenient means by which the free ends of the rods 48 and 49 may be rigidly secured to the juncture box as indicated by the weld material 65 in Fig. 3. It is preferred that the juncture box is first rigidly secured to the heater body and thereafter the walls 64 secured to the rod ends, the effect thereof being to rigidly interconnect the juncture box, the main body portion and the rod in a single unit. This is extremely important inasmuch as it is desired to alleviate as much as possible any tendency for relative movement between the various component parts of the heater strip and to this end it will be seen that the rigid connection of the juncture box to the main body on the one hand and the rigid connection between the juncture box and the heater rod on the other hand very nicely rigidifies the several elements and in effect integrates them into a single unit.

A preferred manner of securing the heater rod ends 48 and 49 to the wall 64 is by means of silver solder although the invention is by no means intended to be limited to this particular method of fastening. Of course, the connecting metal must have a sufficiently high melting point as to remain in solid form even at the maximum temperature of the heating rod.

As will be seen most clearly in Fig. 7, the conductor 53 of the heating rod extends somewhat beyond the end of the outer casing 51 therefor and for the purpose of this invention the terminal sleeves 66 are rigidly secured to the upper ends of this conductor. The manner in which this is accomplished is by crimping the tubular wall portion 67 of the terminal sleeves, crimped portions being indicated by the reference character 68. This effects a tight fit between the terminal sleeves and the conductor and also establishes a good electrical connection therebetween. The sleeve carries at its upper end a threaded stud 69 and a nut 70 engaged thereupon establishes a means by which a conventional type of conductor terminal may be fastened to the sleeve. Insulating washers 71 constructed of mica or similar material are interposed between the lower edge of the terminal sleeve 66 and the extremity of the casing 51 for the heater rod, such that all possibility of short circuit between these two is eliminated. The bottom wall 58 of the juncture box has rigidly secured thereto an upstanding stud 72 upon which a nut 73 is engaged for establishing connection with a terminal connector of conductor 74. The conductor 74 is in turn connected at its opposite end to one of the taps of a multiprong plug assembly indicated generally by the reference character 75 which is rigidly secured to the cover 76 for the juncture box. The manner in which the plug is secured to the juncture box cover is accomplished by extending the prongs 77 of the plug through an aperture 78 in the cover and terminating them in the threaded end portion 79 upon which a clamp nut 80 is engaged. Of course, suitable insulating means 81 is provided between the cover 76 and the nut 80.

The two conductors 82 which extend between the upper ends or stud portions 69 of the terminal sleeves and two of the prongs of the multi-prong plug 75 are adapted to be connected to a source of electrical current for energizing the heating rod, whereas the conductor 74 is a ground conductor and is thus directly connected to the metallic juncture box and consequently to the strip heater body.

For the purpose of removably securing the juncture box cover 76 to the main portion thereof, the cover is provided with bracket ears 83 and 84 which extend outwardly beyond opposite sides thereof and which are apertured to receive therethrough the fastening elements 85 and 86 which threadedly engage in the horizontal portions 87 and 88 of a pair of L-shaped brackets 89 and 90 which are secured to two opposite side walls of the juncture box. A gasket 91 is interposed between the juncture box cover and the upper edge of the side walls of the juncture box so as to provide a watertight seal therebetween and prevent entry of moisture, foreign material and the like into the confines of the juncture box.

The cover 76 is also provided with a pair of upstanding combined guide and protector members each of which is generally L-shaped in configuration and includes a horizontal foot portion 92 secured in any suitable manner to the cover 76 and an upstanding portion 93 terminating at its upper extremity in an outwardly flared portion 94. The divergent upper extremities 94 extend somewhat vertically beyond the upper ends of the prongs 77 and their divergence provides a guiding action for a female plug member engaged with the prongs. Also, the upstanding portions 93 protect the male and female plug elements and assure that normal handling of the device will not cause breakage of these members.

Figure 5:
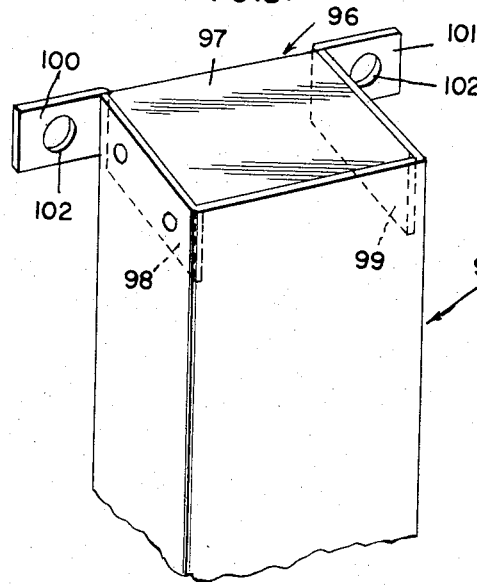
Fig. 5 is an enlarged perspective view showing one end of the strip heater and the manner in which the end cap member is associated therewith and illustrating the same in modified form.

Referring now more particularly to Fig. 5 wherein a modified form of the invention is shown, the main body portion of the strip heater is indicated generally by the reference character 95 and an end cover or cap member therefore is generally indicated by the reference character 96. The end cover is identical in construction with the previously mentioned covers 20 and 21 inasmuch as it includes the vertical cap portion 97 and the right angularly disposed vertical lugs 98 and 99, but the modification is had in the presence of the lateral ears 100 and 101 which project outwardly at the lower ends of the legs 98 and 99. Each ear 100, 101 is provided with an aperture 102 the purpose of which is to permit the heater to be bolted down upon a workpiece. This is particularly useful wherein the strip heater is to be disposed on a vertical surface or on the underside of a horizontal member. In this respect, it is to be understood that in the assembly shown in Fig. 1, additional heaters may be placed on the undersurface of the plates 10 and 11 in backing relation to the strip heaters shown for the purpose of heating both the top and bottom surfaces of the plate simultaneously. The modified end caps are provided, of course, at both ends of the strip heater body and it is to be understood that they do not necessarily need to be bolted down, it being perfectly feasible that the ears be tack welded to the workpiece. After the weld has been completed and it is desired to remove the strip heater so welded to the workpiece, it is merely necessary to break the tack welds and remove the strip heater.

As previously mentioned, one of the main advantages of the invention is that the strip heaters are of relatively low height such that they may be closely positioned to the weld without interfering with the manipulation of the torch or electrode holder manipulated by the welder and it is to be realized that in the interests of so maintaining the height of the overall assembly to a minimum, both the juncture box 56 and the handle assembly may be disposed on one or the other of the side or vertical flanges 16 or 17 of the main body of the strip heater. It may be preferred that insulating material be disposed between the portions 30 and 31 of the cross braces and the flanges 16 and 17 since the cross brace members will, of course, be heated to a substantial degree due to their direct contact with the heating rod, it, of course, being the purpose at all times to direct as much heat as possible to the workpiece rather than to the strip heater body or its component parts. In this respect it is desirable that the interior surface of the body of the strip heater be so surfaced that it will reflect a maximum amount of the radiated heat and deflect the same upon the workpiece. For this purpose, the interior surface of the body may be polished or it may be lined with highly reflective material or the interior surface may be provided with a coating of insulating material which in itself has high reflective characteristics or which is provided with a cover of highly reflective material. In any case, it is always to be borne in mind that the heat is intended primarily to be transferred to the workpiece with a minimum of loss.

It is preferred that the weld material 65 which secures the juncture box to the free ends of the rod be in the nature of silver solder or the like so that the joint can be broken by heating to a suitable temperature, after which the free ends of the rod may be withdrawn from the juncture box. This is particularly useful whenever it may be necessary to replace a heater rod.

The usual method of employing the preheater members for the purpose of welding, or rather to aid in welding, is to place the plates which are to be welded in abutting side-by-side relationship, the abutting edges of which may be beveled in the manner indicated in Fig. 1, and placing heater strips on opposite sides of the joint between the two plates such that a preheating effect will be had throughout the length of the joint between the plates. It may be necessary to accomplish this to place several preheaters in end-to-end relationship and it may be further desired to place preheaters on the opposite faces of the plates. The preheaters are located very close to the abutting edges so that their heating effect will cause the edge areas to be heated to the desired temperature which will usually be within the range of 250° to 350° C. After the edge portions have been heated to the desired temperature, the welding pass is started in a conventional manner and continued to complete a rigid joint between the plates. It is preferred throughout the time the welding process is in operation that the preheating is continued such as to minimize the distortion and buckling which may tend to occur otherwise between the plates.

The precise position of the cross brace members which locate the heater rod so that it may contact the workpiece which is to be welded is not so important as the fact that the apertures in the cross brace members intersect the lower edges of the same so that the heater rod is exposed to permit continuous contact thereof with the workpiece throughout the entire horizontal extent of the heater rod. Of course, in the disposition of the cross brace members as shown in the drawings, the heater rod hangs down below the lower edge of the cross brace members as permitted by the particularly positioned apertures, so that physical contact can be had between the heater rod and the workpiece when the strip heater is placed in operative position.

I claim:

1. A welding preheater for preheating marginal edge portions of plate-like articles to be welded together, comprising an elongate housing, heat producing means disposed within and enclosed by the housing for preheating a marginal edge portion of a plate closely adjacent the area to be welded, said housing having a low silhouette so as to present a minimum obstruction to the manipulation of welding tools, said housing being of channel shape with a top wall, spaced side walls and opposite end walls to provide an enclosure for the heat producing means, cross brace members extending between said side walls and having apertures therein, said heat producing means comprising an electric heating rod projected through the apertures in said cross braces and loosely suspended thereby to permit longitudinal expansion of the rod, said heater rod being looped within the housing and having its free ends projected through an opening in one of the walls of the housing, a juncture box secured to said one wall of the housing and having apertures receiving said free ends of the rod, means securing said free ends to the box and sealing the last mentioned apertures, said box having a removable top and a sealing gasket disposed between the top and the box, an electrical connector plug secured to said top and having electrical connection to the free ends of said rod.

2. A welding preheater for preheating marginal edge portions of plate-like articles to be welded together comprising an elongate housing, heat producing means disposed within and enclosed by the housing for preheating a marginal edge portion of a plate closely adjacent the area to be welded, said housing having a low silhouette so as to present a minimum obstruction to the manipulation of welding tools, said housing being of channel shape with a top wall, spaced side walls and opposite end walls to provide an enclosure for the heat producing means, cross brace members extending between said side walls in spaced relation between the opposite end walls of the housing, each cross brace member including a strip portion extending between said side walls and having a lower edge offset upwardly from the lower free edges of said side walls, each strip portion having an aperture formed therethrough intersecting said lower edge and opening toward said lower edge, said aperture having a greater dimension parallel with said edge at a point displaced upwardly from said edge than at said edge, an electric heater rod projecting through the apertures in said cross brace members and suspending thereby within the confines of said body and extending below said lower edges of the cross brace members to lie closely adjacent the plane of the lower edges of said side walls, said suspension permitting longitudinal expansion of the heater rod, said heater rod being looped within the housing and having its free ends projecting through an opening in one of the walls of the housing, a hermetically sealed container supported by said one wall of the housing, the said free ends of the heater rod extending within said container, and an electrical connector plug mounted on said container and having electrical connection to the free ends of the rod.

References Cited in the file of this patent

UNITED STATES PATENTS

| | | |
|---|---|---|
| 1,883,927 | Ipsen et al. | Oct. 25, 1932 |
| 2,250,870 | Jones et al. | July 29, 1941 |
| 2,314,738 | Schenk | Mar. 23, 1943 |
| 2,457,007 | Sutherland | Dec. 21, 1948 |
| 2,590,417 | Jones | Mar. 25, 1952 |
| 2,627,014 | Kolb | Jan. 27, 1953 |
| 2,629,363 | Brister et al. | May 19, 1953 |
| 2,662,157 | Vallorani | Dec. 8, 1953 |
| 2,667,563 | McOrlly | Jan. 26, 1954 |
| 2,668,896 | Husaczka et al. | Feb. 9, 1954 |
| 2,722,597 | Steiner | Nov. 1, 1955 |
| 2,760,045 | Blue | Aug. 21, 1956 |